(12) United States Patent
Sager

(10) Patent No.: US 8,600,770 B2
(45) Date of Patent: *Dec. 3, 2013

(54) PAYMENT CONVERGENCE SYSTEM AND METHOD

(76) Inventor: Robert David Sager, Manhattan, KS (US)

( * ) Notice: Subject to any disclaimer, the term of this patent is extended or adjusted under 35 U.S.C. 154(b) by 1164 days.

This patent is subject to a terminal disclaimer.

(21) Appl. No.: 11/381,099

(22) Filed: May 1, 2006

(65) Prior Publication Data

US 2007/0094047 A1    Apr. 26, 2007

Related U.S. Application Data

(63) Continuation of application No. 10/217,903, filed on Aug. 13, 2002, now Pat. No. 7,039,593.

(60) Provisional application No. 60/390,179, filed on Jun. 20, 2002.

(51) Int. Cl.
*G06Q 40/00* (2012.01)

(52) U.S. Cl.
USPC .............................................................. 705/2

(58) Field of Classification Search
USPC ........................................... 705/35; 455/406
See application file for complete search history.

(56) References Cited

U.S. PATENT DOCUMENTS

| | | | | |
|---|---|---|---|---|
| 6,681,988 | B2 * | 1/2004 | Stack et al. | 235/380 |
| 7,039,593 | B2 * | 5/2006 | Sager | 705/4 |
| 7,248,855 | B2 * | 7/2007 | Joyce et al. | 455/406 |
| 7,363,265 | B2 * | 4/2008 | Horgan | 705/35 |

* cited by examiner

*Primary Examiner* — Shay S Glass
(74) *Attorney, Agent, or Firm* — Kutak Rock LLP; Bryan P. Stanley

(57) ABSTRACT

A method and system is provided for convergence of multiple independent applications into a single payment vehicle. In the context of a medical procedure, the invention provides for the convergence of medical/dental insurance with at least one secondary payment source to effect payment for the entire procedure. Through the instant invention insurance benefit information can be determined and funds blocked, then secondary payment source(s) can be utilized to effect payment of the insurance co-payment amount. The use of Smart Card technology enables the convergence at the point of sale of information about multiple applications/payment sources (i.e. insurance plan and secondary payment plan) that are processed to determine the amount of payment to be received from each source.

8 Claims, 3 Drawing Sheets ized the full potential of the Smart Card technology.

PAYMENT CONVERGENCE SYSTEM AND METHOD

RELATED APPLICATIONS

This application is a continuation of U.S. application Ser. No. 10/217,903 filed Aug. 13, 2002, now U.S. Pat. No. 7,039,593, and which claims priority to U.S. Provisional Application Ser. No. 60/390,179, titled Payment Convergence System and Method, filed Jun. 20, 2002 by Robert David Sager, the entire disclosures of which are incorporated herein by reference.

FIELD OF THE INVENTION

The present invention relates to a payment convergence system and method. The invention permits multiple independent payment options to be bundled into a single payment vehicle. The invention also permits the convergence at the point of sale (POS) of information about multiple independent payment options using Smart Card technology.

BACKGROUND OF THE INVENTION

Smart Card technology is currently in use in several industries, including healthcare, banking, entertainment and transportation. A Smart Card is a plastic card similar to a credit card, which is embedded with a computer chip that stores and transacts data between users. This data is associated with either value, information or both, and is stored on the card.

There are two types of Smart Cards, memory cards and microprocessor cards. Memory cards do not have any sophisticated processing power and are incapable of managing files dynamically. There are three primary types memory cards: Straight Memory Cards, Protected/Segmented Memory Cards, and Stored Value Memory Cards. Straight Memory Cards simply store data and have no data processing capabilities, they are analogous to floppy disks of varying sizes. Straight memory cards do not have any mechanism to lock the data; thus anyone with a reader can access the data stored on the card.

Segmented Memory Cards have built-in logic to control user access to the memory of the card. Data stored on such a Smart Card is protected through a password or system key. Segmented Memory Cards can be divided into logical sections to provide for planned multi-functionality of the card.

Stored Value Memory Cards are used for storing value or credits. These cards can be either disposable or rechargeable and usually incorporate permanent security devices such as password keys and logic that are hard-coded into the chip by the manufacturer. The memory on these types of Smart Cards is essentially set up as a counter. For example a telephone card may have twelve memory cells, one for each minute of talk time. One memory cell is cleared each time a minute of telephone talk time is used. Once all twelve memory cells are cleared, no more talk time is available and the card is either discarded or recharged with more talk time.

Microprocessor Cards have on-card dynamic data processing capabilities that permit the combination of multiple applications onto a single card. For example, a single Smart Card can function as an individual's driver's license, their credit card, their phone card and their health insurance card. These multiple-application Smart Cards are usually "co-branded" with the names of each of the individual companies utilizing an application on that Smart Card (i.e. credit card company, phone company, health insurance company, etc).

An important feature of these multi-application Smart Cards is that the information relating to each individual application be kept separate from the other applications, and that the appropriate information only be available for use with its intended application. For instance, the information that is available to a merchant where a purchase is being made should only include the individual's credit card number, and should not include any information necessary to make long distance phone calls or the individual's health insurance information. Each application must be kept separate for security and privacy reasons.

For some time now, Smart Cards have been used in the health insurance industry to help process and settle routine medical claims. The use of the Smart Cards in a health insurance application provides tremendous benefit in being able to simplify and automate eligibility information and co-payment information on the spot. Prior to the use of Smart Cards, a clinic's office staff would make photocopies of a patient's insurance card and call an 800 number to verify coverage. One swipe of a Smart Card connected to an insurer's computer system can provide assurance that the patient is eligible for treatment, the amount of the associated co-pay, and any restrictions in the payment of fees.

Because of the importance of maintaining a separation between multiple applications located on a single Smart Card, the prior art usage of Smart Card technology has been a strictly "horizontal" referencing and updating of information and instructions for each application independently. Currently no system exists for "vertically" combining information from the independent applications of a multiple application Smart Card, or for "vertically" combining information from independent applications of any other card with multi-functionality. For example, a single Smart Card might include multiple applications such as a credit card and a health insurance card. Theoretically, using such a multi-application Smart Card of the prior art, a healthcare subscriber could utilize both the healthcare application and the payment application to allow the provider to obtain both the insurance coverage portion and the patient's co-pay portion for a procedure. Nevertheless, the provider would be required to have appropriate equipment and security codes to access both applications. Additionally, the provider would have to access each application independently, or horizontally. First the provider would have to access the healthcare application to determine policy coverage and amount of co-payment required, and then separately access the payment application to obtain the patient's co-payment. Such would require considerable time and expense to the provider due to equipment needs, paperwork and manpower. Even more time and resources would be utilized if a third application, such as a healthcare line of credit account, is included on the card.

Basically the multiple-application Smart Cards (or any other cards with multi-functionality) of the prior art act only to eliminate the need of the card holder to carry a separate card for each application. Using such a card of the prior art, the card holder can have insurance policy information, healthcare line of credit account information, and credit card information all on a single card. Unfortunately, when the cardholder goes to the doctor's/dentist's office and presents the card, the healthcare provider will be required to perform manually separate checks for each application that is to be utilized. Once the medical/dental procedure is determined, the healthcare provider will need to phone, fax or email the patient's insurance company to determine whether the procedure is covered, and the amount of payment that the provider will be eligible to receive from the insurance company for the procedure. Once the amount of payment to be expected from the insurance company is determined, the provider will then have to independently phone, fax or email the healthcare line of credit company to determine how much payment the provider can expect from that source. Finally, if the insurance company payment amount combined with the line of credit amount is not enough to cover the entire cost of the procedure, the provider must collect the remainder of the costs from the patient. If the patient chooses to pay by credit card, the provider must obtain authorization for credit (holding against a line of credit, also referred to as blocking or reservation of funds) and complete settlement of funds in the traditional manner of usage for a credit card. It would be beneficial if the healthcare provider could avoid the time and expense of performing these multiple checks independently.

Determining the amount of payment to be expected from the insurance company by itself can be a fairly complex procedure based upon a co-pay percentage, co-pay limits and policy limits. For example, a dental policy may have a $3000 yearly policy limit. Additionally, the patient's co-pay might be 20% up to a maximum out-of-pocket of $250. Thus, assume the patient has already had a procedure this year that costs a total of $1000, the insurance company would have paid its 80% or $800, and the patient would have paid its 20% or $200. Now, assume the patient needs to have a procedure for which the total cost is $2000. The insurance company's 80% portion would be $1600, and the patient's 20% portion would be $400. Nevertheless, the patient's maximum out-of-pocket is $250, so the patient only pays $50 for this procedure, and the insurance company pays the additional $350 of the patient's portion of the co-pay. This leaves a total paid by insurance of $1950 for the second procedure, and a yearly total of insurance benefits of $2750. Now assume the patient needs a third procedure that will cost $1000. Because the patient has already met its yearly out-of-pocket amount the insurance company should cover the cost of the entire procedure. But, if the insurance company pays the entire $1000, it will have provided a total yearly benefit of $3750, whereas the policy limit is $3000. Thus, the insurance company will only pay $250 for this third procedure to give a yearly total of $3000. The patient will be responsible for the additional $350 due for the procedure.

As complicated as the above example appears when one knows all the important information such as the co-pay percentage, maximum out-of-pocket, policy limit and the amount of benefits already utilized by the patient, it becomes even more complicated, and sometimes even impossible, to accurately determine the amount of payment to be expected from an insurance company when all of this information is not readily available to the healthcare provider. Often, under the current system, a healthcare provider will only be given part of this information, such as the co-pay percentage and the policy limit. The provider may not have access to the amount of benefits already utilized, thus making it impossible for the provider to determine the amount of payment that can be expected from insurance before the procedure is performed and the claim is processed. Additionally, if the provider does know the amount of benefits already utilized at the time the procedure is performed, and then the provider is required to submit a claim for benefits to the insurance company through the traditional paper form channels, it is possible that another claim could be processed and paid before the provider's claim but after the provider determined the amount of benefits utilized. Such would change the amount of benefits utilized, and could reduce the amount of payment made to the healthcare provider. Thus, it would be beneficial if the healthcare provider could determine the amount of benefits utilized and the amount of payment expected from the insurance company prior to performing the procedure. Additionally, it would be beneficial if the provider could obtain authorization for funds with the insurance company prior to performing the procedure to ensure payment of the full amount determined to be expected.

OBJECTS OF THE INVENTION

A principal object of the present invention is to provide a payment convergence system and method that assists healthcare providers in obtaining insurance coverage information about patients while also obtaining payment for procedures, or portions of procedures, that are not covered by the patient's insurance policy.

Another object of the present invention is to provide a secure system that converges, or makes available in a single application located at the point of sale (POS), multiple types of information including but not limited to payment options for patient co-pay portion of a procedure, patient insurance benefit information, and third party co-pay information.

Another object of the instant invention is to enable a provider to determine the amount of payment to be expected from multiple independent sources, and to obtain authorization for payment from those sources prior to performing a procedure.

Yet another object of the instant invention is to provide a system that allows for the creation of a new bundled product by merging a person's insurance benefits with pre-approved credit.

SUMMARY OF THE INVENTION

The above objectives are achieved by converging multiple independent payment sources/options into a single payment vehicle for a single transaction. First, a total cost for the transaction ("transaction total") will be determined at the point of sale. Then information regarding the method of payment for the transaction ("convergence information") will be obtained at the point of sale. Once the appropriate convergence information has been obtained, a processing that utilizes the convergence information can be performed to determine the amount of payment to be received from each payment source to satisfy payment for the transaction total. Payment can then be collected from each payment source in the amounts determined.

As the object of the invention is to obtain payment from multiple independent sources, current Smart Card technology serves as a convenient medium for storage of information regarding the payment sources. Information about multiple payment sources can be stored at different locations on the same Smart Card. Nevertheless the convergence information can be contained in numerous forms contemplated by the prior art. For example, it may be possible to maintain convergence information on a magnetic strip card or even in the form of a number. Convergence information in the form of a number would be similar to that of a vehicle identification number, wherein the location of a digit in a number has significance.

Convergence information can include data, processing instructions, or both data and processing instructions. The data can include information about the payment sources with which the party attempting to make payment has a relationship ("primary payment source information" and "secondary payment source information"), such as contact information for the payment sources, member identification numbers, policy terms, credit limits, etc. The instructions can include information establishing the interrelation and interaction between the multiple payment sources. These instructions can include such information as the order for utilizing the various payment sources, and the timing of utilizing such sources. Convergence information does not necessarily include all information about the payment sources. In such a situation the data (convergence information) held on the Smart Card will be used as the "key" for data lookup via "Host Networks" of the payment sources.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

The instant invention provides a system that allows for interrelation and interaction of multiple applications of a single Smart Card (or other data storage medium) to perform a complex processing and a distributed processing of all the information stored in the various applications of the Smart Card.

Although the preferred embodiment of the inventive system is illustrated in the context of a dental insurance plan, the instant invention can be applied to any form of medical coverage and performance of medical procedures, or even any other situation in which multiple independent applications must be utilized to accomplish a single outcome. For example, the instant invention could be applied to the purchase of a vehicle, which often requires financing approval and payment from a bank, as well as partial payment or money down from the purchaser.

In the preferred embodiment, a dental patient will have a Smart Card that includes information contained on the patient's insurance card, but also includes information that is not normally contained on an insurance card. The card of the instant invention will be generally referred to as a convergence card. The convergence card will include the patient's personal information such as name, address, PIN, etc. and the patient's dental insurance information, such as plan identification number, insurance company contact information (or a link to the insurance company), insurance eligibility, plan information and insurance status (i.e. amount left to reach policy limits or co-pay maximums, etc.). Along with insurance information, the Smart Card will also have information about the patient's desired method to affect payment of the patient's co-pay obligation (first party payment method). The patient's preferred payment method could be a credit card, debit card, check, electronic benefits transfers (EBT), gifts, loyalty or prepayments. The Smart Card can also include information about third party payments such as insurance settlements, government assistance and private credit.

Figure 1:
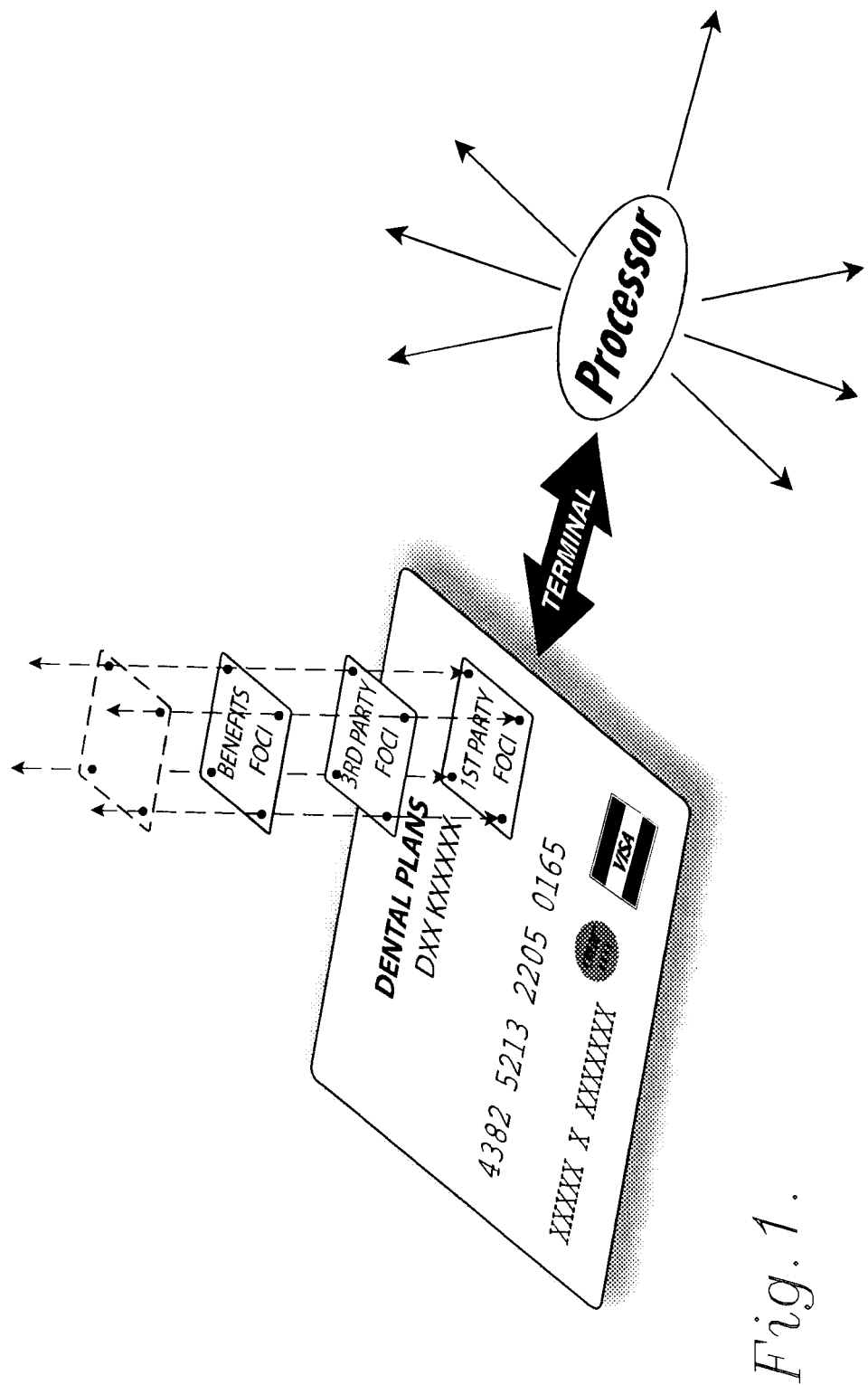
FIG. 1 is a pictorial illustration of a multiple application Smart Card of the instant invention.

FIG. 1 shows a pictorial illustration of a multiple application Smart Card of the instant invention. To better illustrate the instant invention, In FIG. 1, each application is shown as a vertical layer that is stacked on the Smart Card. Although the information stored on the Smart Card of the instant invention is illustrated as "vertical layers", it is understood that the actual physical storage of information on a Smart Card can be accomplished in a single storage location with data being stored either randomly or sequentially. Each layer contains a different type of information that can be used independently from the information of all other layers. In the illustrated embodiment there are four layers: A) Card Holder Information, B) Insurance Benefit Information, C) Third Party Payment Information, and D) First Party (Card Holder) Payment Information.

Card holder information includes name, address, phone, social security number, and so forth.

Insurance benefit information includes insurance policy identification information (account number), plan information, subscriber/patient information, secondary coverage information (i.e. partial coverage from a spouse's insurance policy, etc.), policy limits, co-pay percentages, eligibility information, amount of policy limits and co-pay caps utilized, and any other information relating to insurance coverage.

Third party payment information includes any insurance coverage that is secondary to the primary insurance policy, as well as any private credit (line of credit) accounts for healthcare, any cafeteria plans, governmental assistance, social security, gifts certificates, charitable gifts, prepayments, loyalty credit (i.e. credit earned for customer loyalty, similar to frequent flyer program), or any other source that is not the primary insurance company and is not a direct payment from the patient.

First party payment information includes any payment that is directly funded by the patient, such as the patient's credit card account, debit card, check, EBT, or any other account in which the funds are controlled by the patient.

As is shown in FIG. 1, the Smart Card of the instant invention can be co-branded to include multiple applications that can be utilized independently from one another. In the illustrated embodiment, the card is co-branded as a credit card and as a dental insurance card. The credit card information can be used independently from the dental insurance information. For example, the card holder can use the card to make a purchase at a department store just as they would use their credit card. The purchase will be invoiced on the card holder's credit card statement, and not be in any way associated with the card holder's dental insurance policy. Note that the Smart Card of the instant invention does not necessarily contain multiple applications or have to be co-branded (i.e. insurance card and credit card), it can be a single medical coverage application that includes a patient's credit card and insurance company information as part of the patient's medical coverage information. For example, if the card holder's preferred payment method (first party payment) for co-pay is the patient's credit card, the patient's credit card number and other essential information (i.e. expiration date, billing address, etc.) will be stored on the Smart Card for access by the dentist as the first party payment source. In such a situation, any other merchant (non-dentist) cannot access the first party payment information to make a traditional credit card payment.

Further note that even if the card of the instant invention is co-branded with a credit card company, or some other first party payment company, use of the co-branded first party payment source is not necessarily required by the instant invention. For example, if an insurance card is co-branded with a credit card, the card holder might chose an entirely different payment source, such as EBT, to effect payment of the co-pay portion of a procedure.

Figure 2:
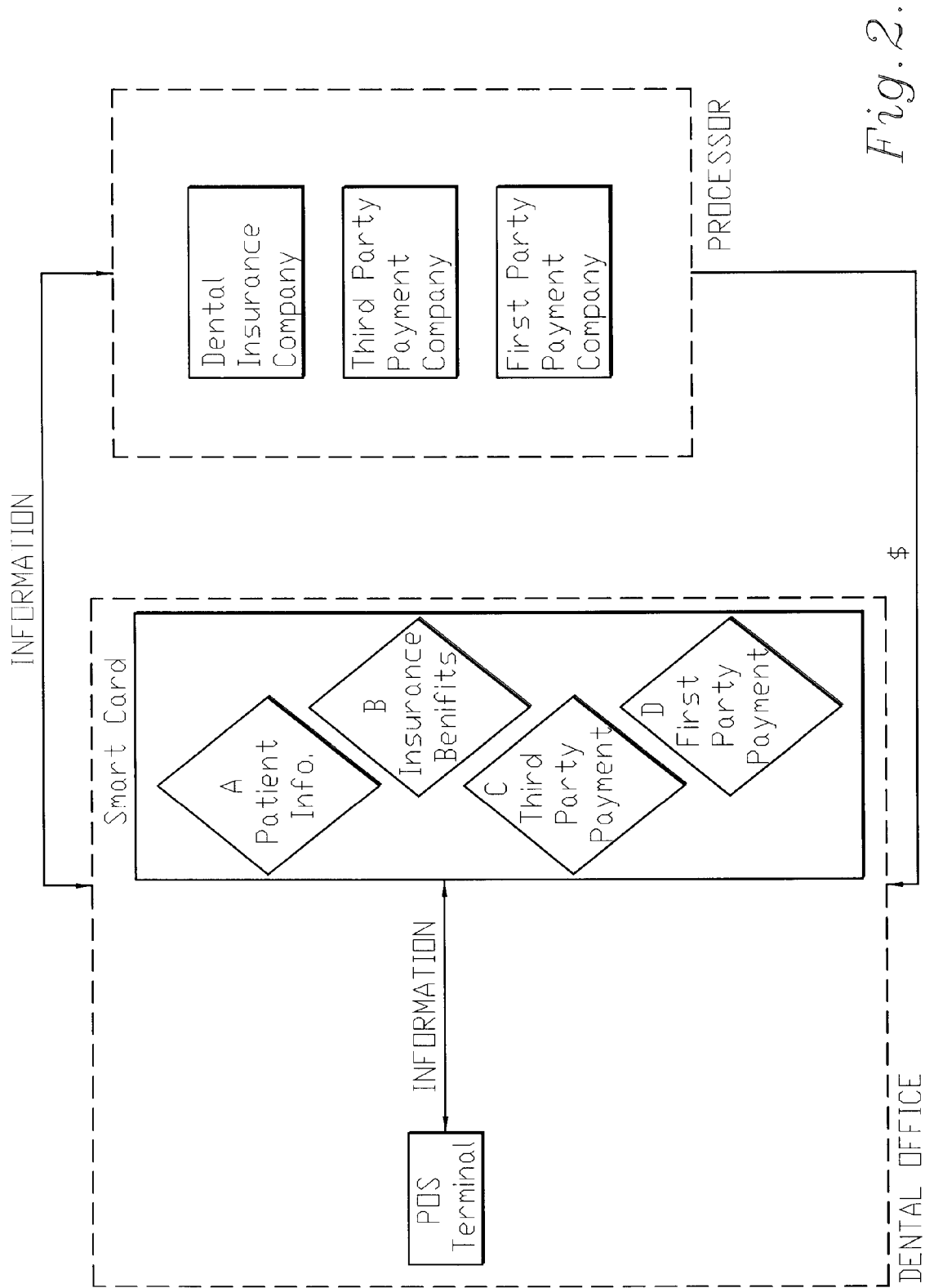
FIG. 2 is a diagram showing the vertical and horizontal convergence of multiple applications of the instant invention.

FIG. 2 shows the vertical and horizontal convergence of multiple applications of the instant invention. As is shown in FIG. 2, the Smart Card will contain multiple layers of information. As is discussed above, these multiple layers of information each contains information that is useful to the cardholder independent of all other information contained in the other layers. For example layer B, insurance benefit information, is useful by itself to provide the dentist/medical provider with information about the card holder's insurance policy so that the dentist knows how and where to bill for payment for a medical procedure. In a similar fashion, layer D, first party payment information, is useful by itself to effect payments for other purchases made away from the dentist's office. As is discussed above, the information contained in each layer might be accessible individually for use outside the dentist's office if the card is co-branded.

In FIG. 2 it is shown how the card allows information to flow horizontally. For example, insurance plan information can flow from the insurance provider to the dentist as is already done in the prior art. Additionally, as has been done in the prior art of credit cards, etc., authorization for funds can be obtained and settlement can be accomplished for services provided by the dentist. FIG. 2 also shows how the system of the instant invention allows information to flow vertically. As is shown in FIG. 2, information from the independent applications/layers is converged together to perform complex distributed processing which results in payment to the dentist for the entire dental procedure. The amount of insurance coverage can be determined along with the amount of any third party payments and then the amount of co-pay that must be paid by the patient. Payment can then be collected from all sources—insurance company, third party and patient.

The instant invention involves multiple relationships which are all centered around a Smart Card. The Smart Card stores information about relationships that exist between the card holder and financial service providers such as the dental insurance company, first party payment companies, and third party payment companies. The card holder/patient has a relationship with the dental insurance company in the form of the insurance plan (subscriber contract), wherein the insurance company agrees to pay for certain dental procedures performed on the patient. The patient also has relationships with the first party payment companies and third party payment companies as a customer through credit/debit accounts, checking accounts or other similar payment methods. These relationship provide that the payment companies will make payments on behalf of the patient as a payor in the amounts desired to the persons desired by the patient.

The Patient and dentist have a relationship wherein the dentist is to perform a dental procedure on the patient in exchange for payment. The information about the relationships between the patient and the financial service providers enables relationships between the dentist and the financial service providers. The dentist uses the information stored on the Smart Card to contact the financial service providers to obtain payment from the financial service providers on behalf of the patient. As is shown in FIG. 2, the dentist's office and the financial service providers exchange information and payment through the assistance of a Processor. The Processor has relationships with the dentist, the first party payment companies, the third party payment companies, and the insurance company. The Processor of the instant invention can either be a single entity that has relationships with all relevant parties, or alternatively, the Processor of the instant invention can actually comprise multiple Processors each having relationships that assist in enabling the relationships between the parties. For example one Processor may act as a clearing house for transferring payment information between the first party payment company and the dentist. A separate Processor may act as a clearing-house for transferring information between the dentist and the insurance company. An indirect relationship exists between the patient/card holder and the Processor wherein the patient is a beneficiary of the relationships between the other parties and the Processor. It is also possible that the relationship between the dentist and the insurance company (or other financial service providers) can be accomplished through a direct line to those companies rather than through a Processor.

As is discussed above, the Smart Card contains all the information about the patient (i.e. name, address, etc.) and the patient's relationships with the insurance company, the banks and any third party (i.e. healthcare line of credit) payment companies. This information essentially enables the relationships between the dentist and the insurance company, and the dentist and the first party payment company, etc., and allows for the transfer of information between these parties. Initially, all this information provides the dentist with basic information about the patient to allow the patient to initiate a relationship with the dentist. After the relationship is initiated between the patient and the dentist, the Smart Card provides the dentist with updates of all essential information. The updated information can be information stored on the Smart Card, information transmitted to the dentist's office from the insurance company (or bank or other financial service provider) in a transmission enabled by contact information on the Smart Card, or a combination of both. The Smart Card provides the dentist with information necessary to contact (through the Processor) the insurance company, third party payment company, and first party payment company to make a sequence of inquiries and answers.

Examples of inquiry and answers between the dentist and the insurance company, third party payment/credit company and first party payment company include: identification of the patient and the patient's account with each respective company; verification of information on the Smart Card, predetermination of eligibility for benefits/payment, authorization for payment, issuance of payment and update of information about the patient and its relationships.

The POS terminal at the dentist's office may access the Smart Card in several phases, first to set up a patient's account and update patient information about the dental plan, the private credit plan (third party payment method) and the first party payment method. The dentist will also access the Smart Card via the POS terminal to predetermine what benefits will be obtained from each source for a specific procedure prior to treatment and establish the relationships between the dentist and the insurance company and other payment companies based upon the patient's prior relationships. The dentist can then perform the treatment, and bill for services. If additionally services are required that were not anticipated initially, the dentist can again use the Smart Card to predetermine what benefits will be obtained from each source before performing the additional procedure. Once the procedure is complete the dentist will use the Smart Card information to obtain payments from all sources in the respective amounts that were predetermined. Payments can be submitted directly from the payment sources to the dentist (or the dentist's bank account).

Figure 3:
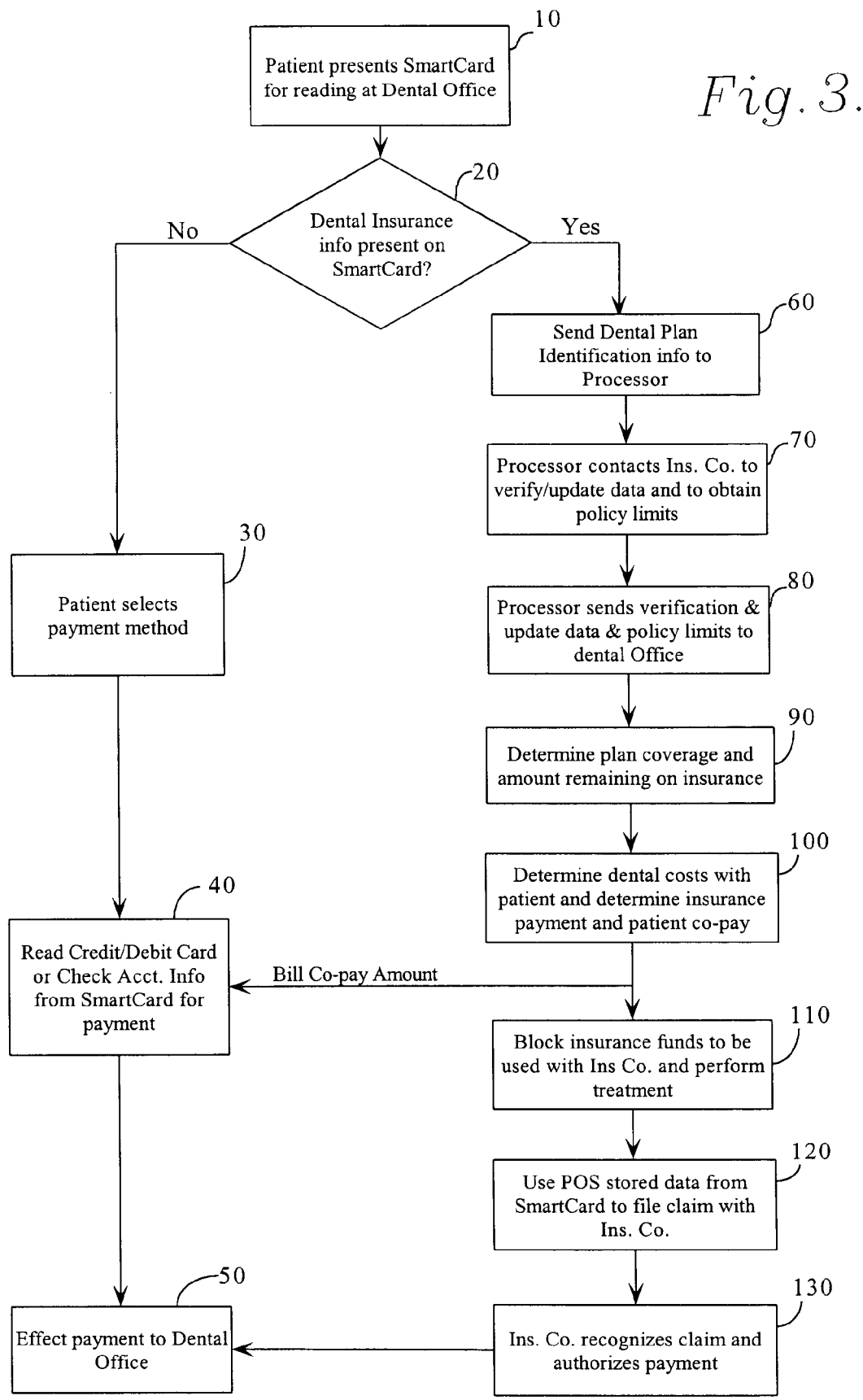
FIG. 3 is a flowchart showing one possible embodiment of the instant invention that utilizes an insurance benefit application and a first party/patient payment application.

The flowchart of FIG. 3 shows one possible embodiment of the instant invention as it is implemented at a dentist's office utilizing two applications/layers, insurance and first party (patient) payment. This embodiment shows a series of inquiries and answers that might be transmitted through the instant invention. In step 10 the patient goes into the dentist's office for treatment and initially presents the Smart Card to the dentist who has appropriate equipment to read the information contained on the card (POS machine). The dentist will insert or swipe the Smart Card and check to see if dental insurance plan information is available on the Smart Card in step 20. If the Smart Card does not include dental insurance information, the patient will select a non-insurance payment method in step 30. If the appropriate payment information selected by the patient is available on the Smart Card, that information will be accessed by the dentist's POS device in step 40, and then payment will be effected to the dentist in step 50 through a Processor using the patient's payment information.

If the patient's Smart Card does contain dental insurance information, that information will include a dental plan Identification information, such as an identification number. In step 60, the dentist's Smart Card reader (POS device) will send the patient's dental plan Identification information to Processor. The Processor then contacts the patient's insurance company in step 70 to verify and update the data contained on the patient's Smart Card, and to obtain additional insurance information not provided on the Smart Card, such as policy limits. In step 80 the Processor will send the data obtained from the insurance company back to the dental office. The POS device at the dentist's office will then determine whether the desired dental procedure is covered by the patient's dental insurance in step 90. If the procedure is covered by the patient's insurance, the amount of coverage and the co-pay amount required to be paid by the patient will be determined in step 100. In the preferred embodiment this will be done by an automated system through the POS terminal. Alternatively, this step can be accomplished manually by the dentist and patient, or automatically on the Smart Card itself, if appropriate processing capability is available. Alternatively, the insurance company can determine the amount of co-pay required by the patient and transmit that amount to the provider. The patient's co-pay will be obtained through steps 40 and 50 discussed above.

In step 110, the dentist office will obtain authorization for the amount of insurance funds to be used for the patient procedure to be performed by the dentist. This will ensure that policy limits are not exceeded before the procedure is complete, and that the amount of co-pay required by the patient does not change.

In step 120, the dentist's POS device will use the patient's information stored on the Smart Card to file a claim with the insurance company. This claim can be filed electronically through a Processor (this is the most efficient use of Smart Card technology) or it can be printed and filed in the more traditional paper format. In some cases the claim might be filed electronically with a Processor that prints the claim and files the claim with the insurance company in paper format. The claim will usually be filed after the dental procedure is complete, which might be at the same time as the funds are authorized in step 110, or it could be several days/months later. It does not matter because the funds are already blocked, and the co-pay amount will not change. In step 130 the insurance company recognizes the claim and authorizes payment. This could be accomplished electronically or through more traditional methods.

Note that the Processor contacted to obtain payment using the patient's payment information (i.e. the patient's credit card in step 50) may be a separate Processor than the one contacted to obtain insurance information in step 60.

It is understood that a significant benefit of this instant invention is that the complex distributed processing between the multiple independent applications of the Smart Card is accomplished at the point of sale location, thus allowing the Processor to act merely as a clearing-house for the information. Nevertheless, it is possible to conduct portions of, or the entire, complex distributed processing at other locations such as the insurance company or even the Processor (or some other central clearing-house location) without departing from the spirit and scope of the instant invention.

The Smart Card of the instant invention can be either a memory card or a multi-function, microprocessor card. It is even possible that a magnetic strip could be used to store information instead of, or in combination with the chip of a Smart Card, or that some other combination of multiple data storage devices may be used. If a memory card (or some other storage medium without a microprocessor) is used, the complex distributed processing discussed above will probably take place at the POS device. Nevertheless, the information stored on the card (or other data storage medium) will act as the hub (intersection, junction, nexus, node) for this distributed processing. The information located on the card permits all necessary information, such as insurance policy information and patient's credit card information (for patient's portion of co-pay) to be collected at a single location (whether actually collected on the card, at the POS device or from the Processor's system) so that the determination of payment allocation can be made at that location. This processing allows information to be gathered from multiple sources (insurance company, credit card company, etc.) without any co-mingling of information between the sources. The information is only co-mingled at the location where the distributed processing takes place, which is where all the collected information is needed.

An important aspect of the instant invention is the fact that multiple forms of payment for a procedure are merged or bundled into a single product. Essentially, the instant invention allows the card holder's insurance benefits to be combined with their credit card (or other preferred payment vehicle) into one simple payment mechanism. The cardholder is essentially empowered by knowing up front how much a procedure will cost the patient out-of-pocket and that payment for the entire procedure can be accomplished. The patient and dentist both know that payment will be made because credit has been pre-approved from all payment sources.

Although the instant invention has been described in the context of healthcare (dental or medical), it is understood that the merging of multiple forms of payment into a single payment vehicle can be applied to numerous applications outside the healthcare industry.

The Smart Card technology provides security to the card holder that is HIPPA compliant using such features as PIN codes, firewalls, special codes, and infinite rolling codes. Transmission of data from the POS device will be secure either by using a private network (Processor), encryption of data, or point to point networks. Communication methods could include telephone lines, wireless technology, DSL, cable modems and the like.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the payment convergence system and method is used, and advantageous, new and useful results obtained, the new and useful elements, arrangements and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A payment convergence system comprising:
    a portable storage medium;
    a primary payment source information stored on said storage medium;
    at least one secondary payment source information stored on said storage medium; and
    a convergence information stored on said storage medium, said convergence information comprising instructions readable by a point of sale terminal accessing said storage medium while said storage medium is located at the location of said point of sale terminal, said instructions being used by said point of sale terminal for determining appropriate combination and order of utilization of said primary payment source information and said secondary payment source information to provide a single payment vehicle by communicating electronically through said point of sale terminal with said primary payment source and said at least one secondary payment source, such that payment is obtained by said point of sale terminal by determining at said point of sale terminal a primary payment amount to be collected from said primary payment source and at least one secondary payment amount to be collected from said at least one secondary payment source.

2. The system as claimed in claim 1 wherein said instructions are stored as data on said storage medium.

3. The system as claimed in claim 2 wherein at least a portion of said instructions are contained on said storage medium through the significance of the storage locations of said primary payment source information and said at least one secondary payment source information.

4. The system as claimed in claim 3 wherein at least a portion of said instructions are stored in a point of sale terminal.

5. The system as claimed in claim 2 wherein said storage medium comprises a Smart Card.

6. The system as claimed in claim 1 wherein said instructions comprise instructions for first processing said primary payment source information to determine a primary payment amount and then processing said at least one secondary payment source information to obtain payment of a secondary payment amount which comprises a remainder of a transaction total due after payment of said primary payment amount.

7. A method of providing payment for transaction comprising the steps of:
    storing primary payment source information and consumer credit instructions on a portable storage medium, said consumer credit instructions including order information;
    determining a transaction cost;
    obtaining said primary payment source information and said consumer credit instructions from said storage medium via a point of sale terminal while said storage medium is located at the location of said point of sale terminal;
    utilizing said order information to determine an order for utilizing said primary payment source information and information regarding a consumer credit vehicle;
    analyzing by said point of sale terminal a primary payment amount to be provided by said primary payment source for the transaction and a remainder; and
    assigning electronically for payment the remainder amount to said consumer credit vehicle through said point of sale terminal by utilization of said consumer credit instructions, such that payment is obtained by said point of sale terminal by determining at said point of sale terminal a primary payment amount to be collected from said primary payment source and at least one secondary payment amount to be collected from said consumer credit vehicle.

8. The method as claimed in claim 7 wherein said consumer credit vehicle is selected from the group consisting of a first party payment source, a third party payment source, and any combination thereof.

* * * * *